Patented Jan. 8, 1952

2,581,448

UNITED STATES PATENT OFFICE 2,581,448

PROCESS FOR THE MANUFACTURE OF $\Delta^{9(11)}$-12-KETO STEROID ACIDS AND PRODUCTS OBTAINED THEREBY Erwin Schwenk, Montclair, N. J., assignor to Schering Corporation, Bloomfield, N. J., a corporation of New Jersey No Drawing. Application June 12, 1947, Serial No. 754,278

14 Claims. (Cl. 260—397.1)

My invention relates to an improved process for the manufacture of compounds of the 10,13-dimethyl cyclopentanopolyhydrophenanthrene series and more particularly of $\Delta^{9(11)}$-12-keto compounds of this series.

The present application is a continuation-in-part of my copending application, Serial No. 578,800, filed February 19, 1945, now abandoned.

It is the general object of the invention to provide an improved procedure for the manufacture of 12-keto steroid compounds suitable for use as intermediates in the manufacture of various hormones, and particularly of hormones of the adrenal cortex.

More specifically, it is an object of the invention to provide an improved process for the manufacture of 3-hydroxy $\Delta^{9(11)}$-12-keto compounds of the cyclopentanopolyhydrophenanthrene or steroid series having at the 17-position a carboxyl group joined directly or through one or more carbons to the 17-carbon. Other objects of the invention will appear as the following, more detailed, description of the invention proceeds.

The acids derived from desoxycholic (3,12-dihydroxy cholanic) acid by the shortening of the side chain and having a double bond from carbon atom 9 to carbon atom 11 are of importance as intermediates in the preparation of certain hormones found in the adrenal cortex. However, only the 3-hydroxy $\Delta^{9(11)}$-12-keto cholenic acid has been prepared up to now (Wallis and Chakravorty, J. A. C. S. 62, 318–20 (1940)). This was done by the bromination of the 3-acetoxy 12-keto cholanic acid and elimination of HBr from this acid by treatment with sodium ethylate.

According to the present invention, 3-hydroxy-12-keto compounds of the steroid series having a carboxyl group joined either directly or through one or more carbon atoms to the 17-carbon are dehydrogenated by reaction with selenium dioxide in such a manner that a double bond is created between the 9- and 11-carbons. My invention is of particular value in connection with the production of $\Delta^{9(11)}$-12-keto compounds of the desoxycholic acid series, by which expression I include 3-OH 12-keto cholanic acid itself and its 17-degradation products down to and including 3-OH 12-keto etio-cholanic acid.

I have found that selenium dioxide, and its hydrated form as selenious acid, are capable of effecting a valuable type of dehydrogenation affecting the 11-carbon of the 12-keto compounds above referred to. The end result of the reaction is that a double bond is created between the 9- and 11-carbons. This result probably arises from dehydration of an intermediately formed 11-hydroxy compound, but it is to be understood that I am not committed to this theory. Thus 3-hydroxy 12-keto etio-cholanic acid on heating with selenium dioxide (or selenious acid) possibly yields initially the 3,11-dihydroxy 12-keto etio-cholanic acid, which is then dehydrated on further heating to the $\Delta^{9(11)}$-12-keto etio-cholenic acid. The 3-hydroxy-12-keto cholanic, norcholanic and bisnorcholanic acids are similarly converted, by a net loss of two hydrogen atoms, into the corresponding $\Delta^{9(11)}$-acids.

The following formulas explain this course of reaction:

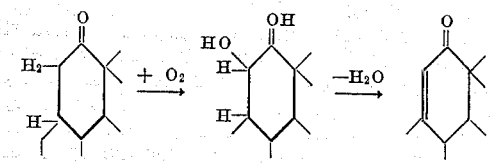

Before the selenium dioxide reaction can be carried out, it is necessary to protect the 3-hydroxy group by conversion into an acyl-oxy group, for instance, by treatment of the starting hydroxy acids with acetic anhydride, whereby 3-acetoxy acids are obtained. Another way of protecting the 3-hydroxy group is by introducing a succinic acid residue into it. These 3-succinyloxy 12-keto acids of the cholanic acid series can be readily prepared by the oxidation of the 3-succinyloxy 12-hydroxy cholanic acids with chromic acid in acetic acid. (Compare: "The preparation of the homologs of 3-hydroxy-12-keto-cholanic acid," by Erwin Schwenk, Byron Riegel, Robert Bruce Moffett and Elsie Stahl: J. A. C. S. 65, 549 (1943).) The 3-hydroxy group can also be protected in other ways, as by etherification, for example, by conversion into a methoxy or ethoxy group. After the oxidation or dehydrogenation, the 3-hydroxyl group can be restored by hydrolysis.

The reaction can be carried out, for example, by acetylation of the 3-hydroxy-12-keto acid in a mixture of acetic acid and acetic anhydride, whereby the reaction mixture, after completion of the acetylation, can be directly used for the subsequent treatment with selenium dioxide. This reagent is then added directly to the acetylation mixture. The oxidation with selenium dioxide can also be conducted in solvents like acetic acid, acetic anhydride, aromatic hydrocarbons, or dioxan, or in other solvents not attacked by selenium dioxide. Instead of the selenium dioxide, as already indicated, selenious acid ($H_2SeO_3$) can also be used.

The following examples will serve to illustrate the invention, but are not to be regarded as indicating the limits thereof.

EXAMPLE 1

*3-hydroxy-$\Delta^{9(11)}$-12-keto cholenic acid*

One part of 3-acetoxy 12-keto cholanic acid, 5 parts of acetic acid and 0.5 part of $H_2SeO_3$ were refluxed for eight hours. The reaction mixture was then filtered through a fritted glass funnel and the filtrate poured into ice water. After filtration, the product was saponified and the sodium salt precipitated by addition of solid sodium chloride. The sodium salt was then dissolved in water and acidified. The 3-hydroxy-$\Delta^{9(11)}$-12-keto cholenic acid was crystallized from dilute methanol and then from ethylacetate; M. P. 173.5–174.5° C.

EXAMPLE 2

*3-acetoxy $\Delta^{9(11)}$-12-keto cholenic acid methyl ester*

One part of 3-succinoxy 12-keto cholanic acid (.01 mole), 6 parts of acetic acid and 0.4 part of $H_2SeO_3$ (50% excess) were refluxed for five hours and then filtered free of the precipitated selenium. The filtrate was poured into ice water and the filtered product crystallized from dilute acetone with carbon black. The product obtained had a M. P. of 231.8–234.5° C. After another recrystallization from ethyl acetate, the M. P. of the 3-succinoxy $\Delta^{9(11)}$-12-keto cholenic acid was 233.5–235.5° C.

The reaction product was saponified and then acidified, and the crude 3-hydroxy-$\Delta^{9(11)}$-12-keto cholenic acid was obtained (M. P. 163.5–166.5°). The substance was recrystallized again from ethyl acetate and then gave melting points of 171.5 and 172.5–173.5° C. The methyl ester of the 3-hydroxy-$\Delta^{9(11)}$-12-keto cholenic acid was prepared, using Freudenberg's method; it showed a M. P. of 115–118° C. By acetylation with acetic anhydride and pyridine the 3-acetoxy $\Delta^{9(11)}$-12-keto cholenic acid methyl ester of M. P. 148–149° C. was obtained.

EXAMPLE 3

*3-hydroxy-$\Delta^{9(11)}$-12-keto cholenic acid*

One part of methyl 3-succinoxy 12-keto cholanate, 4 parts of acetic acid and 0.4 part of selenious acid were refluxed for eight hours; then another 0.15 part of selenious acid was added and the mixture again heated for eight hours. A third portion of 0.075 part of selenious acid was then added and the mixture again refluxed for eight hours. After filtration, the reaction mixture was poured into ice water, filtered and washed thoroughly. The product was worked up in the usual way by saponification, and the 3-hydroxy-$\Delta^{9(11)}$-12-keto cholenic acid was isolated by acidification. After one recrystallization from dilute acetone, using carbon black, the M. P. was 171.5–172.5° C.

EXAMPLE 4

*3-hydroxy-$\Delta^{9(11)}$-12-keto nor-cholenic acid*

One part of 3-acetoxy 12-keto nor-cholanic acid, 4 parts of acetic acid and 0.5 part of selenious acid ($H_2SeO_3$) were refluxed for five hours. The reaction mixture was diluted with methanol and filtered free of selenium. The filtrate was poured into ice water and filtered. The unsaturated compound was then saponified in aqueous alkali in the usual way and then acidified with hydrochloric acid. The 3-hydroxy-$\Delta^{9(11)}$-12-keto nor-cholenic acid was recrystallized from dilute acetone; M. P. 253–254.5° C.

EXAMPLE 5

*3-hydroxy-$\Delta^{9(11)}$-12-keto bis-nor-cholenic acid*

One part of 3-acetoxy 12-keto bis-nor-cholanic acid was dissolved in 5 parts of acetic acid and 0.55 part of selenious acid was added. The mixture was refluxed five hours. The mixture was diluted with methanol and filtered free of selenium. The filtrate was poured into ice water and filtered. The unsaturated compound was then saponified in aqueous alkali on the steam bath, acidified, and recrystallized from dilute acetone. The 3-hydroxy-$\Delta^{9(11)}$-12-keto bis-nor-cholenic acid had a M. P. of 294–296° C.

EXAMPLE 6

*3-hydroxy-$\Delta^{9(11)}$-12-keto etio-cholenic acid*

One part of 3-acetoxy 12-keto etio cholanic acid was refluxed with six parts of acetic acid and 0.5 part $H_2SeO_3$ for eight hours. Then 0.025 part of $H_2SeO_3$ was added and refluxing continued for seven and one-half hours. The mixture was filtered from the precipitated selenium. The filtrate was poured into water, and an ether extract was saponified in aqueous alkali for three hours on the steam bath. The alkaline solution was acidified and extracted. The ether residue was crystallized from dilute acetone and methanol, using carbon black. The 3-hydroxy-$\Delta^{9(11)}$-12-keto etio-cholenic acid remained behind in the mother liquor.

EXAMPLE 7

*3-acetoxy $\Delta^{9(11)}$-12-keto-etiocholenic acid*

A 0.700 g. portion of 3-acetoxy-12-keto-etiocholanic acid was refluxed for 10 hours with 0.34 g. of selenious acid (183% excess) and 5 cc. of acetic acid. After dilution with methanol, the selenium was separated by filtration and the solution was poured into ice water. The cream-colored precipitate was filtered and dried. The yield was 0.62 g. This crude product was recrystallized once from dilute acetone using "Darco," and a second time from dilute acetone alone. There was obtained 0.43 g. of slightly yellowish needles, M. P. 214.3–214.8°.

Anal.—Calc'd for $C_{22}H_{30}O_5$: C, 70.56; H, 8.08. Found: C, 70.89; H, 8.26.

Another similar experiment gave the same substance, M. P. 210.3–212°, $[\alpha]_D = +142°$ (dioxane).

Anal.—Calc'd for $C_{22}H_{30}O_5$: C, 70.56; H, 8.08. Found: C, 70.41; H, 8.26.

Saponification of the 3-acetoxy compound with alkali, followed by acidification with hydrochloric acid gave the 3-hydroxy-$\Delta^{9(11)}$-12-keto-etio-cholenic acid.

I claim:

1. Process for the manufacture of 12-keto steroid acids and their esters which comprises heating a 12-keto steroid having at the 3-position a member of the class consisting of hydroxyl and groups convertible into hydroxyl with the aid of hydrolysis, and having at the 17-position a member of the class consisting of

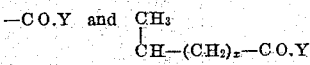

in an inert solvent with a member of the group consisting of selenium dioxide and selenious acid to effect dehydrogenation at the 11-carbon, $x$ being an integer from 0 to 2 inclusive, while Y is a member of the group consisting of OH and alcohol radicals.

2. Process according to claim 1 wherein the starting compound has at the 3-position a non-oxidizable group convertible into hydroxyl with the aid of hydrolysis.

3. Process for the manufacture of $\Delta^{9(11)}$-12-keto compounds of the cyclopentanopolyhydrophenanthrene series, which comprises heating a 3-R 12-keto etio-cholanic acid, R being a non-oxidizable group convertible into hydroxyl with the aid of hydrolysis, in an inert solvent with a member of the group consisting of selenious acid and selenium dioxide until dehydrogenation at the 9,11-carbons is effected.

4. Process according to claim 1, wherein the starting compound has at the 3-position a group convertible into hydroxyl with the aid of hydrolysis, and including the step of hydrolyzing the reaction product to provide a free hydroxyl in the 3-position.

5. Process according to claim 1, wherein the heating takes place in an organic solvent for a number of hours.

6. Process according to claim 1, wherein the heating takes place in an organic solvent under reflux for a number of hours.

7. Process according to claim 6, wherein the solvent is acetic acid.

8. Process according to claim 1, wherein the heating takes place in acetic acid solution at reflux temperature.

9. Process according to claim 3 wherein the reaction product is hydrolyzed to provide a free hydroxyl group in the 3-position.

10. Process for the manufacture of 3-hydroxy $\Delta^{9(11)}$-12-keto cholanic acid which comprises refluxing 3-acyloxy 12-keto cholanic acid with a member of the group consisting of selenium dioxide and selenious acid in an organic solvent until dehydrogenation at the 9,11-carbons is effected, and thereafter hydrolyzing the reaction product.

11. Process for the manufacture of 3-hydroxy $\Delta^{9(11)}$-12-keto nor-cholanic acid which comprises refluxing 3-acyloxy 12-keto nor-cholanic acid with a member of the group consisting of selenium dioxide and selenious acid in an organic solvent until dehydrogenation at the 9,11-carbons is effected, and thereafter hydrolyzing the reaction product.

12. Process for the manufacture of 3-hydroxy $\Delta^{9(11)}$-12-keto bis-nor-cholenic acid which comprises refluxing 3-acyloxy 12-keto bis-nor-cholanic acid with a member of the group consisting of selenium dioxide and selenious acid in an organic solvent until dehydrogenation at the 9,11-carbons is effected and thereafter hydrolyzing the reaction product.

13. The process which comprises heating a solution of a 12-keto 10.13-dimethyl cyclopentanopolyhydrophenanthrene compound having at the 3-position a member of the class consisting of hydroxyl and groups convertible into hydroxyl with the aid of hydrolysis, with a member of the group consisting of selenium dioxide and selenious acid to effect removal of hydrogen at the 11-carbon.

14. 3 - hydroxy $\Delta^{9(11)}$ - 12-keto bisnor-cholenic acid.

ERWIN SCHWENK.

REFERENCES CITED

The following references are of record in the file of this patent:

UNITED STATES PATENTS

| Number | Name | Date |
| --- | --- | --- |
| 2,341,250 | Wallis | Feb. 8, 1944 |
| 2,403,683 | Reichstein | July 9, 1946 |

OTHER REFERENCES

Stiller: Jour. Chem. Soc., 1938, pp. 353–357.
Lardon et al.: Helv. Chim. Acta, 26 (1943).
Turk: Am. Paint. Jour., vol. 28, No. 9, pp. 16, 18, 20 (1943).
Vene: Compt. Rend. vol. 216, pp. 772–774 (1943).